US011167378B1

(12) United States Patent
Steinmeier

(10) Patent No.: US 11,167,378 B1
(45) Date of Patent: Nov. 9, 2021

(54) TECHNIQUES FOR DETERMINING WELD QUALITY

(71) Applicant: David W. Steinmeier, Arcadia, CA (US)

(72) Inventor: David W. Steinmeier, Arcadia, CA (US)

( * ) Notice: Subject to any disclaimer, the term of this patent is extended or adjusted under 35 U.S.C. 154(b) by 0 days.

(21) Appl. No.: 16/865,277

(22) Filed: May 1, 2020

(51) Int. Cl.
*B23K 11/10* (2006.01)
*B23K 11/11* (2006.01)
*B23K 11/25* (2006.01)
*B23K 31/12* (2006.01)
*B23K 9/095* (2006.01)

(52) U.S. Cl.
CPC .......... *B23K 31/125* (2013.01); *B23K 9/0953* (2013.01)

(58) Field of Classification Search
CPC .. B23K 11/06–0935; B23K 11/10–115; B23K 11/12; B23K 11/25–258
See application file for complete search history.

(56) References Cited

U.S. PATENT DOCUMENTS

| | | | |
|---|---|---|---|
| 4,419,558 A | | 12/1983 | Stiebel |
| 5,484,976 A | | 1/1996 | Sbalchiero et al. |
| 6,274,840 B1 | | 8/2001 | Kanjo |
| 9,266,187 B2 | | 2/2016 | Cohen |
| 10,625,365 B2 | | 4/2020 | Sawanishi et al. |
| 10,646,950 B2 | | 12/2020 | Miwa et al. |
| 2007/0029288 A1* | 2/2007 | Fernandez | ........... B23K 11/255 219/86.51 |
| 2008/0041827 A1* | 2/2008 | Li | ........... B23K 11/255 219/109 |
| 2013/0248505 A1* | 9/2013 | Anayama | ............. B23K 31/125 219/130.01 |
| 2013/0276299 A1* | 10/2013 | Kiridena | .................. B21J 15/08 29/650 |
| 2013/0334177 A1* | 12/2013 | Haeufgloeckner | .... B23K 11/10 219/91.1 |
| 2015/0069026 A1* | 3/2015 | Cielinski | ................. H02P 29/60 219/91.1 |
| 2016/0008914 A1* | 1/2016 | Okita | .................... B23K 11/115 219/78.01 |
| 2018/0361498 A1* | 12/2018 | Zhang | ................ B23K 20/2275 |

(Continued)

FOREIGN PATENT DOCUMENTS

DE 4305364 C1 4/1994
DE 4332807 C2 4/1994

(Continued)

OTHER PUBLICATIONS

DE4305364C1 Google Translation. DE4305364C1 Publication date: Apr. 28, 1994. 19 pages.

(Continued)

*Primary Examiner* — Michael A LaFlame, Jr.
(74) *Attorney, Agent, or Firm* — Loza & Loza, LLP; Stephen D. Burbach

(57) ABSTRACT

A method and/or a system estimate a quality of a weld. For example, a weld information algorithm may be generated based on, for each of a plurality of welds, at least two of a first maximum weld force parameter, a minimum weld force parameter, or a second maximum weld force parameter. The weld information algorithm may be used to estimate the weld quality of a particular weld based on weld information obtained for that weld.

30 Claims, 11 Drawing Sheets

(56) References Cited

U.S. PATENT DOCUMENTS

| | | | |
|---|---|---|---|
| 2019/0126407 A1* | 5/2019 | Cho | B23K 31/125 |
| 2020/0116767 A1* | 4/2020 | Stolze | G01R 19/257 |
| 2020/0156179 A1* | 5/2020 | Hioki | B23K 35/402 |
| 2020/0284673 A1* | 9/2020 | Heinemann | G01L 5/0076 |
| 2021/0023646 A1* | 1/2021 | Sawanishi | B23K 11/115 |

FOREIGN PATENT DOCUMENTS

| | | |
|---|---|---|
| DE | 102015215190 A1 | 2/2017 |
| FR | 2631866 A1 | 12/1989 |

OTHER PUBLICATIONS

DE4332807C2 Google Translation. DE4332807C2 Publication date: Apr. 21, 1994. 14 pages.
DE102015215190A1 Google Translation. DE102015215190A1 Publication date: Feb. 16, 2017. 9 pages.
FR2631866A1 Google Translation. FR2631866A1 Publication date: Dec. 1, 1989. 9 pages.

\* cited by examiner

TECHNIQUES FOR DETERMINING WELD QUALITY

FIELD

This disclosure relates generally to the welding of two or more parts that involve a force to keep the parts together during the heating process and, more specifically but not exclusively, to determining the quality of such a weld.

INTRODUCTION

Various techniques may be used to determine the quality of a weld. Examples of these techniques include destructive testing, weld strength estimation, and visual inspection.

Destructive testing may involve increasing the amount of force applied to a weld (e.g., a weld on a welded part) until the weld is damaged in some way. Based on the amount of force required to damage the weld and/or the damage caused to the weld, a determination may be made as to whether the weld was sufficiently strong for the intended use of the part. For example, if the amount of force required to break the weld exceeds the amount of force expected to be imparted on the part during the intended use by a certain threshold, the welding process may be deemed sufficient. If not, the welding process may be modified and the destructive testing repeated on another part that is welded using the modified welding process.

Weld strength estimation techniques may involve monitoring one or more conditions during a welding process and estimating whether the resulting weld is sufficiently strong. For example, the amount of weld current applied during the welding process and the welding time may be measured and this information may be used to estimate the quality of the weld.

In practice, the above techniques may have one or more disadvantages. For example, destructive testing may be relatively time intensive and therefore increase the amount of time taken to weld multiple parts (e.g., on a production line). As another example, weld strength estimation techniques might not provide a sufficiently accurate estimate of the strength of a weld. Therefore, a need exists for effective techniques for determining the quality of a weld.

SUMMARY

The following presents a summary of several aspects of the disclosure to provide a basic understanding of these aspects. This summary is not an extensive overview of all contemplated features of the disclosure, and is intended neither to identify key or critical elements of all aspects of the disclosure nor to delineate the scope of any or all aspects of the disclosure. Its purpose is to present various concepts of some aspects of the disclosure as a prelude to the more detailed description that is presented later.

The disclosure relates in some aspects to a determining weld quality. For example, a weld information algorithm may be generated based on, for each of a plurality of welds, two or more of a first maximum weld force parameter, a minimum weld force parameter, or a second maximum weld force parameter. The weld information algorithm may then be used to estimate the weld quality of a particular weld based on weld information associated with that weld.

The disclosure relates in some aspects to a method of generating a weld information algorithm. In some aspects, the weld information algorithm may be a weld quality estimation algorithm. In some aspects, the weld information algorithm may be a weld strength prediction algorithm. In some implementations, the method includes conducting a plurality of welds and determining weld information associated with the plurality of weld. Here, for each weld of the plurality of welds the weld information may include at least two of a weld current, a first maximum weld force parameter, a minimum weld force parameter, or a second maximum weld force parameter. The method may further include determining weld strength information associated with the plurality of welds and generating a weld information algorithm based on the weld information and the weld strength information.

The disclosure relates in some aspects to a method of using a weld information algorithm to estimate the quality of a particular weld. In some implementations, the method includes conducting a weld and determining weld information associated with the weld. Here, the weld information may include at least two of a first maximum weld force parameter, a minimum weld force parameter, or a second maximum weld force parameter. The method may further include inputting the weld information into a weld information algorithm and obtaining an indication of weld quality associated with the weld based on the weld information algorithm.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as apparatus, system, or method implementations it should be understood that such implementations can be implemented in various apparatuses, systems, and methods.

BRIEF DESCRIPTION OF THE DRAWINGS

These and other aspects of the disclosure will be more fully understood when considered with respect to the following detailed description, the appended claims, and the accompanying drawings, wherein:

Figure 1:
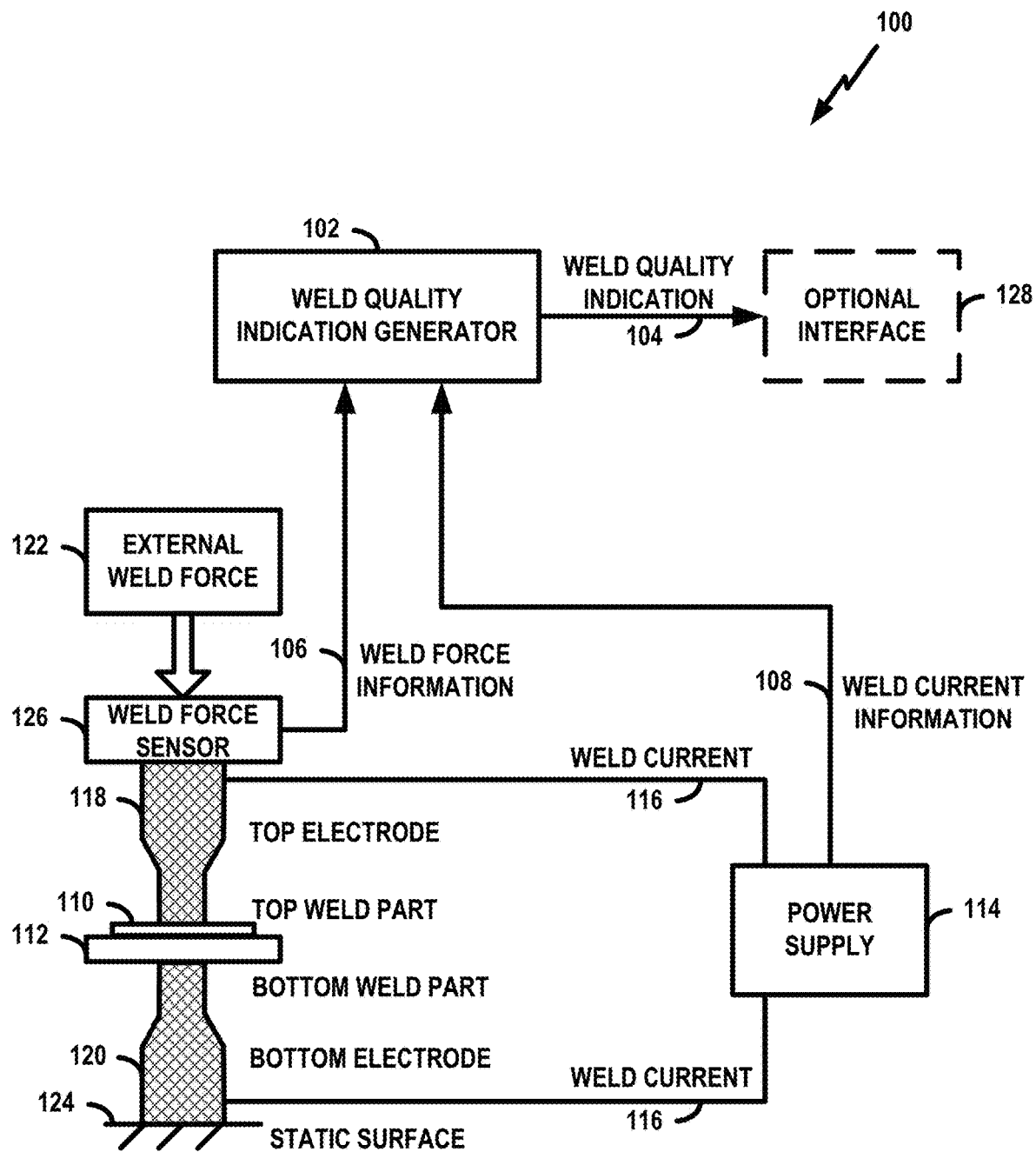
FIG. 1 is a conceptual diagram of an example of a welding system according to one or more aspects of the disclosure.

In accordance with common practice, the various features illustrated in the drawings are generally not drawn to scale. Accordingly, the dimensions of the various features may be arbitrarily expanded or reduced for clarity. In addition, some of the drawings may be simplified for clarity. Thus, the drawings typically do not depict all of the components of a given apparatus or method. Finally, like reference numerals may be used to denote like features throughout the specification and figures.

DETAILED DESCRIPTION

The description that follows sets forth one or more illustrative embodiments. It will be apparent that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

The disclosure relates in some aspects to estimating the quality of a weld in a welding system where a force is applied to a weld part (e.g., a workpiece). One example of such a welding system is a resistance welding system. The teachings herein may be equally applicable to other types of welding systems where a force is applied (e.g., laser welding systems, brazing systems, etc.).

FIG. 1 illustrates a welding system 100 that includes a weld quality indication generator 102 that generates a weld quality indication 104. As discussed in detail below, the weld quality indication 104 is based on weld force information 106 (and, optionally, weld current information 108) obtained during a welding operation.

In the example of FIG. 1, a top weld part 110 is being welded to a bottom weld part 112. Here, a power supply 114 generates a weld current 116 that flows through the top weld part 110 and the bottom weld part 112 via a top electrode 118 and a bottom electrode 120, respectively.

During the welding operation, a mechanical force (designated as an external weld force 122) is applied to the top weld part 110 and the bottom weld part 112 via the top electrode 118 and the bottom electrode 120. To this end, the bottom electrode 120 is fixed to a static surface 124 (e.g., a surface that does not move) in this example. A mechanical force could be applied to the top weld part 110 and the bottom weld part 112 in other ways in other examples. One non-limiting example of a weld head that could be used to weld the top weld part 110 and the bottom weld part 112 is a model 73 servo motor driven weld head sold by Amada Miyachi Co., Ltd. Other types of weld heads could be used as well.

A weld force sensor 126 measures the force at the weld during the welding operation and generates a signal indicative of that force (e.g., the weld force information 106). As discussed in more detail below, the amount of force measured at the weld may change during the welding operation. For example, the measured weld force may change as the top weld part 110 and the bottom weld part 112 heat up, as the weld partially collapses, and as the weld cools off. As discussed in more detail below, this weld force information may be used to generate an indication of the quality of the weld.

The weld force sensor 126 may take different forms in different implementations. In some implementations, the weld force sensor 126 may include a strain gauge. In some implementations, the weld force sensor 126 is a load cell. One non-limiting example of a load cell is a model LLB 130 load cell sold by Futek Advanced Sensor Technology, Inc. Other types of weld force sensors could be used as well.

As discussed in more detail below, the weld quality indication generator 102 may generate the weld quality indication 104 based on at least one of a first maximum weld force, a minimum weld force, a second maximum weld force, or any combination thereof, measured during the welding operation as indicated by the weld force information 106. For example, this information may serve as inputs to a weld information algorithm that outputs the weld quality indication 104.

In some implementations, the weld quality indication generator 102 may generate the weld quality indication 104 based on at least two of the first maximum weld force, the minimum weld force, or the second maximum weld force. That is, in this case, the weld quality indication 104 is based on: 1) the first maximum weld force and the minimum weld force, or 2) the first maximum weld force and the second maximum weld force, or 3) the minimum weld force and the second maximum weld force, or 4) the first maximum weld force, the minimum weld force, and the second maximum weld force.

In some implementations, the weld quality indication generator 102 may generate the weld quality indication 104 based on other information as well. For example, the weld quality indication generator 102 may generate the weld quality indication 104 based on the weld current information 108 provided by the power supply 114. In some implementations, the weld quality indication generator 102 may generate the weld quality indication 104 based on a starting weld force and/or a post weld force as indicated by the weld force information 106.

The weld quality indication 104 may take different forms in different implementations. In some implementations, the weld quality indication 104 may indicate whether the weld quality is acceptable or not acceptable. In some implementations, the weld quality indication 104 may take the form of a value that is representative of weld quality (e.g., a tensile strength). In some implementations, the weld quality indication 104 may indicate the extent to which (e.g., characterized by a number or some other indicator) that the weld quality exceeds or falls below a defined quality level. Other types of indications may be used as well.

The weld quality indication generator 102 may take different forms in different implementations. In some implementations, the weld quality indication generator 102 may be implemented in a processing system (e.g., a computer or a processor).

The welding system 100 may include an interface 128 for providing the weld quality indication 104 to another device. In some implementations, the interface 130 is a user interface that provides a visual or other form of indication to a user (e.g., via a monitor of a computer). In some implementations, the interface 128 is a device interface that sends an indication signal to another device. In some implementations, the device interface may send the indication signal via a communication medium (e.g., via an Ethernet connection, a wireless communication connection, or some other connection) to a remote device. In some implementations, the device interface may send the indication signal to another device (not shown) of the welding system 100 such as a controller that controls one or more parameters of the welding operation (e.g., weld current, weld timing, or applied weld force, etc.) based on the indication signal. For example, one or more of the weld current, the amount of time that the weld current it applied, or the force applied to a part during the welding operation may be increased in response to the indication signal indicating that the quality of a prior weld was less than a threshold quality.

Figure 2:
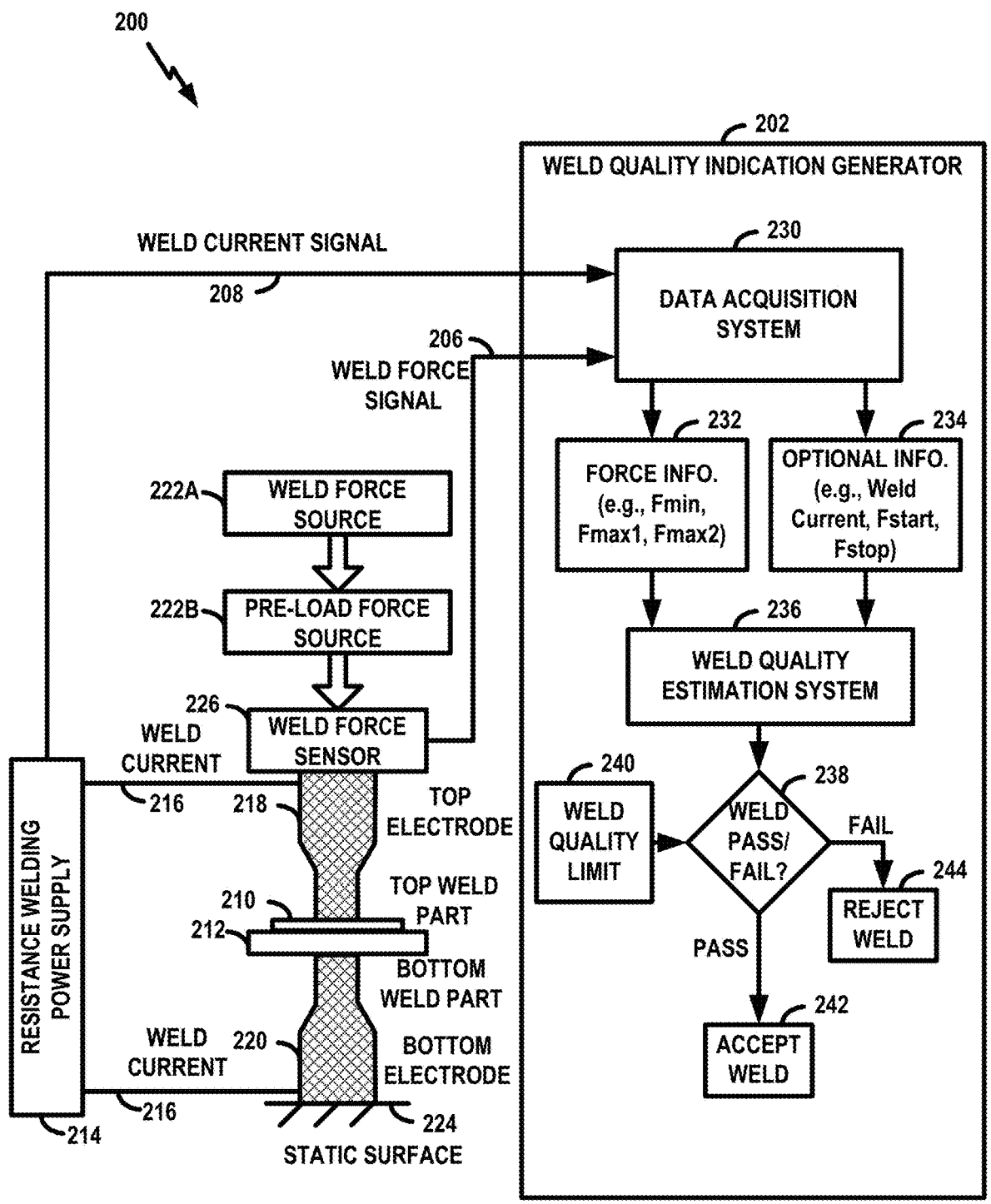
FIG. 2 is a conceptual diagram of an example of a welding system, illustrating additional details, according to one or more aspects of the disclosure.

FIG. 2 illustrates a resistance welding system 200 that includes a weld quality indication generator 202 that generates an indication of whether a weld is accepted or rejected. The resistance welding system 200 describes certain aspects of the welding system 100 of FIG. 1 in more detail according to an example implementation. For example, the weld quality indication generator 202 is an example of an implementation of the weld quality indication generator 102 of FIG. 1. The weld quality indication generator 102 may take other forms in other implementations.

Similar to FIG. 1, in the example of FIG. 2, a top weld part 210 is being welded to a bottom weld part 212. In addition, a resistance welding power supply 214 generates a weld current 216 that flows through the top weld part 210 and the bottom weld part 212 via a top electrode 218 and a bottom electrode 220, respectively.

During the welding operation, mechanical force is applied to the top weld part 210 and the bottom weld part 212 via the top electrode 218 and the bottom electrode 220 (fixed to a static surface 224). A weld force source 222A provides the primary force applied to the top weld part 210 and the bottom weld part 212 during the welding operation. In some implementations, the weld force source 222A includes a servo motor that generates a force applied to the top electrode 218 via a weld force sensor 226 (and, optionally, a preload force source 222B). In some implementations, the weld force source 222A applies compressed air to the weld force sensor 226. For example, the weld force source 222A may include a compressed air generator, at least one air conduit, and at least one aperture configured to generate air pressure. In some implementations, the weld force source 222A applies a spring force to the weld force sensor 226. For example, the weld force source 222A may include at least one spring or other similar mechanism. Other mechanisms for applying a primary force to the weld force sensor 226 may be used in other implementations.

In addition, a pre-load force from the pre-load force source 222B may be applied to pre-load the weld force sensor 226 (e.g., to prevent a loss of force measurement in the event an electrode bounces off a part after contacting the part). In some implementations, the pre-weld force may be up to 15% of the maximum load cell rating. Other pre-load force values may be used in other implementations. In some implementations, the pre-load force source 222B applies compressed air to the weld force sensor 226. For example, the pre-load force source 222B may include a compressed air generator, at least one air conduit, and at least one aperture configured to generate air pressure. In some implementations, the pre-load force source 222B applies a spring force to the weld force sensor 226. For example, the pre-load force source 222B may include at least one spring or other similar mechanism. Other mechanisms for applying a pre-load force to the weld force sensor 226 may be used in other implementations.

The weld force sensor 226 measures the force at the weld (e.g., the force applied to the part being welded) during the welding operation and generates a weld force signal 206 indicative of that force. The weld force signal 206 may correspond to the weld force information 106 of FIG. 1. In some implementations, the weld force signal 206 takes the form of the weld force waveform 302 of FIG. 3.

Figure 3:
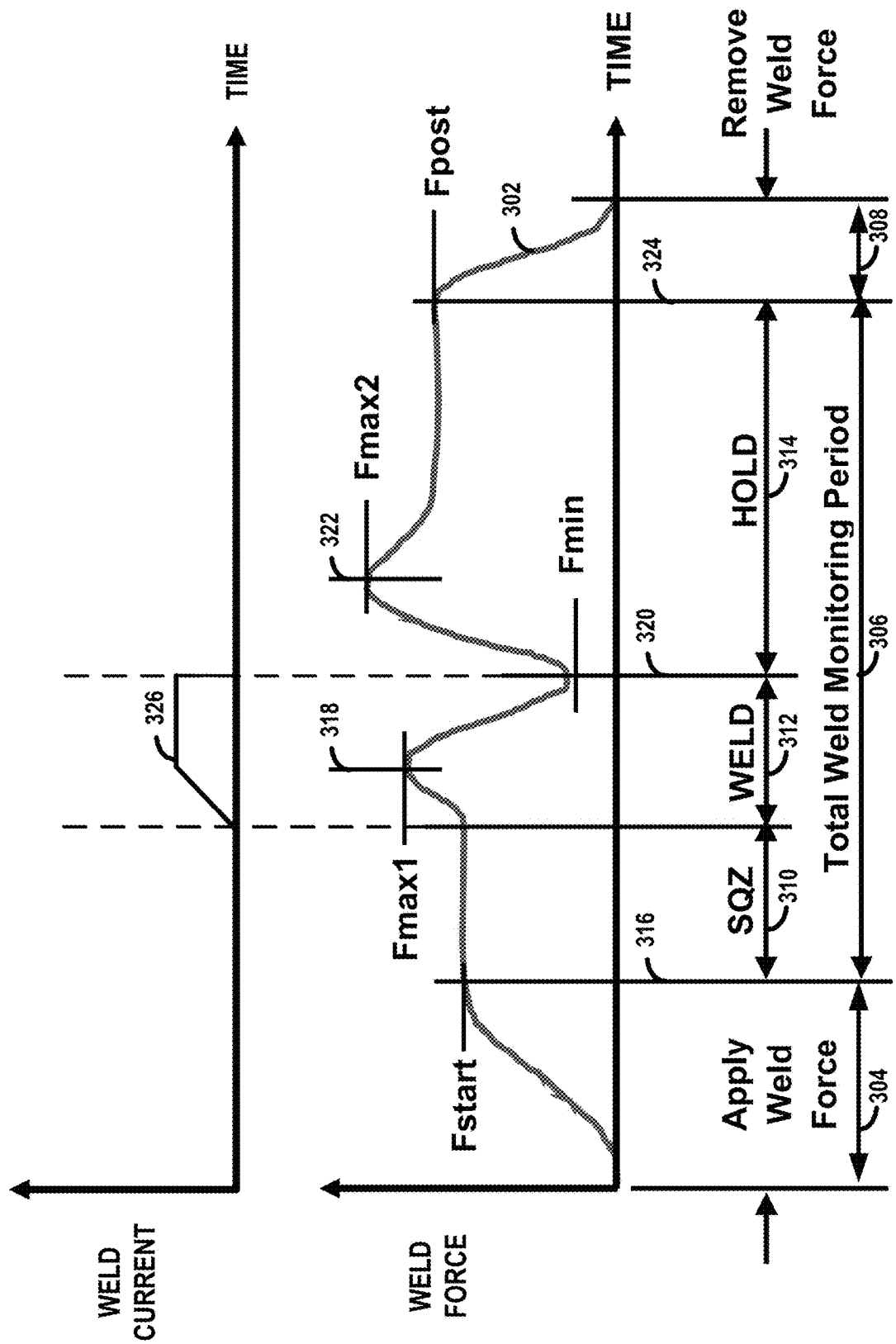
FIG. 3 is an example of welding waveforms according to one or more aspects of the disclosure.

The weld force waveform 302 represents the force at the weld (e.g., as measured by a weld force sensor) during a welding operation. In the example of FIG. 3, the weld force waveform 302 is associated with three time periods. During a first period 304 (also referred to as an Apply Weld Force period), weld force is applied (e.g., the weld force provided by the weld force source 222A is ramped up during this period). The second period 306 covers the weld monitoring process. During the third period 308 (also referred to as a Remove Weld Force period), the weld force is removed (e.g., the weld force provided by the weld force source 222A ramps down).

The weld monitoring process (second period 306) includes a squeeze (SQZ) period 310, a weld period 312, and a hold period 314. The SQZ period 310 follows the first period 304. The force measured at the beginning of the SQZ period 310 (e.g., at a time represented by a vertical line 316) is referred to as a starting weld force (Fstart). As shown in FIG. 3, the measured force may be substantially constant during the SQZ period 310. The weld period 312 corresponds to the period of time when weld current is applied. A first maximum weld force (Fmax1) is measured during the weld period 312 (e.g., at a time represented by a vertical line 318). In addition, a minimum weld force (Fmin) is measured at the end of the weld period 312 (e.g., at a time represented by a vertical line 320 which also corresponds to the beginning of the hold period 314 in this example). A second maximum weld force (Fmax2) is measured during the hold period 314 (e.g., at a time represented by a vertical line 322). The force measured at the end of the hold period 314 (e.g., at a time represented by a vertical line 324 which also represents the beginning of the third period 308 in this example) is referred to as a post weld force (Fpost).

The measured weld forces might not correspond exactly to the maximum and minimum weld forces that occur during the welding process. For example, there may be measurement errors or other errors that occur during the measurement process. Thus, as used herein, the term first maximum weld force refers generally to a first maximum weld force that was measured during the weld period 312 and precedes the minimum weld force measured during the weld period 312 or the hold period 314. Also, as used herein, the term minimum weld force refers generally to a minimum weld force that was measured during the weld period 312 or the hold period 314 and that follows the first maximum weld force and precedes the second maximum weld force. In addition, as used herein, the term second maximum weld force refers generally to a second maximum weld force that was measured during the hold period 314 and follows the minimum weld force measured during the weld period 312 or the hold period 314.

Referring again to FIG. 2, the weld quality indication generator 202 includes a data acquisition system 230 for acquiring the weld force signal 206 from the weld force sensor 226. In some implementations, the data acquisition system 230 includes an analog-to-digital converter (ADC) system that includes an input channel for receiving the weld force signal 206 (and optionally an input channel for receiving a weld current signal 208). In some implementations, the ADC system has a minimum sampling rate of at least 2 kHz.

The data acquisition system 230 derives the parameters shown in FIG. 3 from the weld force signal 206. For example, the data acquisition system 230 may include analysis software that can identify the peaks and valleys occurring in each waveform (e.g., the weld force waveform 302 of FIG. 3) and that can calculate root mean square (RMS) values for the waveform (e.g., for the force points of interest labeled in FIG. 3). In the example of FIG. 2, the data acquisition system 230 derives force information 232 including a first maximum weld force (Fmax1) parameter, a minimum weld force (Fmin) parameter, and a second maximum weld force (Fmax2) parameter from the weld force signal 206.

In some implementations, the data acquisition system 230 may derive optional information 234. For example, the data acquisition system 230 may derive at least one of a starting weld force (Fstart) parameter, a post weld force (Fpost) parameter, a current parameter, or any combination thereof, from the weld force signal 206 and/or the weld current signal 208.

Potential drift in the peak weld force measurements may be reduced by converting the absolute weld force measurements to differential measurements. Converting the absolute weld force measurements to differential measurements may involve, for example, subtracting Fstart from each weld force absolute measurement.

The resistance welding power supply 214 may provide the weld current signal 208 to the weld quality indication generator 202. For example, the weld current signal 208 may indicate the magnitude of the weld current (e.g., a peak value, an average value, instantaneous values over time, etc.) during the welding operation (e.g., during the weld period 312 of FIG. 3). The weld current signal 208 may correspond to the weld current information 108 of FIG. 1. In some implementations, the weld current signal 208 takes the form of the weld current waveform 326 of FIG. 3. In some implementations, the weld current is measured using a Rogowski coil or a precision high current shunt. Other types of current sensors may be used in other implementations.

The data acquisition system 230 may derive a weld current parameter from the weld current signal 208. For example, the data acquisition system 230 may include waveform analysis software that produces the following weld current measurements: Peak Weld Current (Ipk) and RMS Weld Current (Irms). Other current information may be obtained in other implementations. The data acquisition system 230 may synchronize the current waveform with the force waveform (e.g., as in FIG. 3).

Alternatively, in systems where the weld current is held constant throughout the welding process, the data acquisition system 230 may simply use the known current value for estimating weld quality. In this case, the data acquisition system 230 might not receive the weld current signal 208.

The weld quality indication generator 202 includes a weld quality estimation system 236 for estimating a quality of a weld based on the force information 232 (and the optional information 234, if applicable). For example, based on this information, the weld quality estimation system 236 (e.g., that executes a weld information algorithm) generates an indication representative of the quality of the weld. The weld quality indication generator 202 may then compare 238 this indication to a weld quality limit (or threshold) 240 to determine whether to accept the weld 242 or reject the weld 244.

Figure 4:
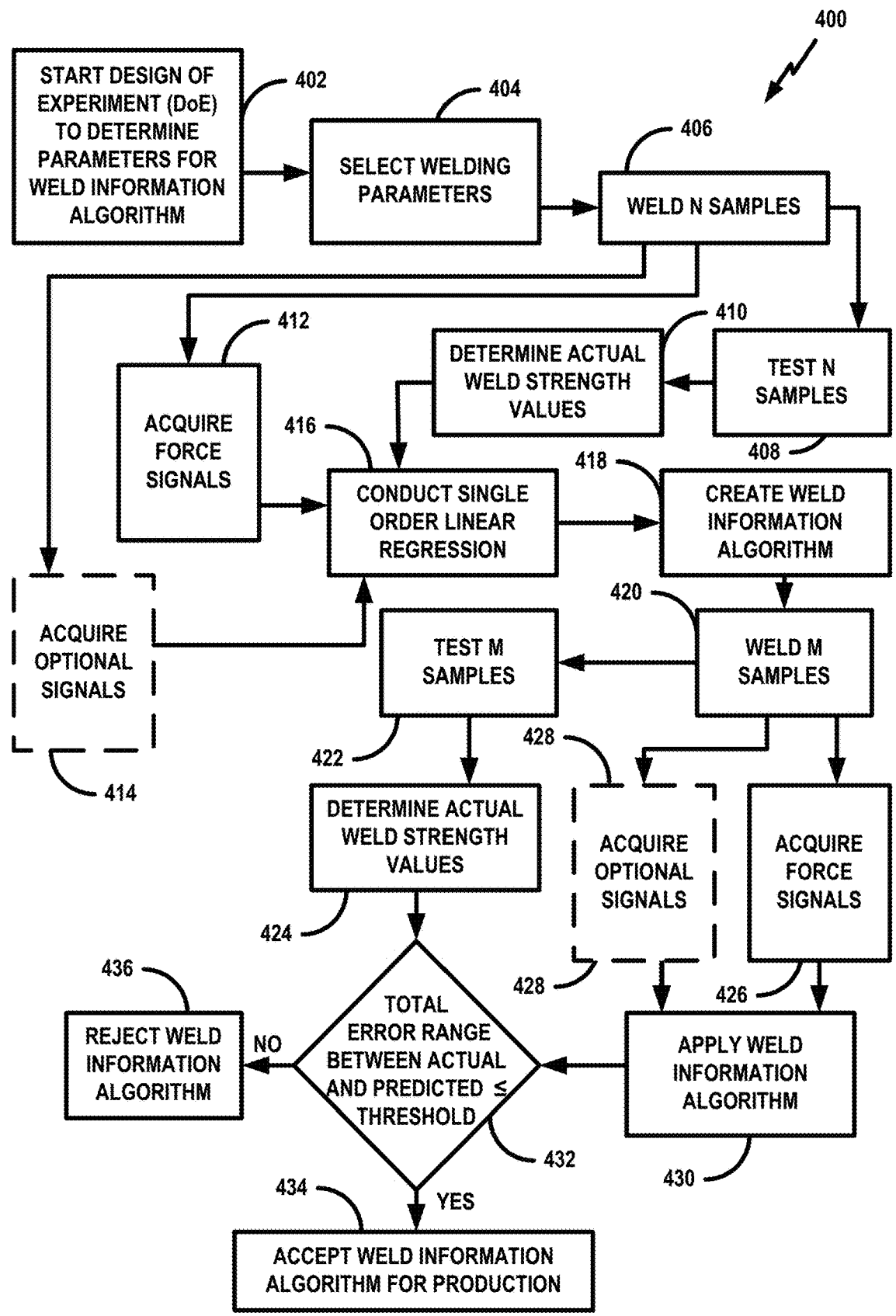
FIG. 4 is a flowchart of an example of a process for generating a weld information algorithm according to one or more aspects of the disclosure.

FIG. 4 illustrates an example of a process 400 for generating a weld information algorithm. The process 400 may take place, for example, in a welding system (e.g., a resistance welding system). Of course, in various aspects within the scope of the disclosure, the process 400 may be implemented using any suitable apparatus capable of supporting welding-related (e.g., resistance welding-related) operations. For example, one or more of the operations of the process 400 may be performed by programming executed by a computer or a processor.

A design of experiment (DoE) is started at block 402 to determine the parameters for the algorithm. As discussed herein, in some implementation, the algorithm may take the form: A+B·(minimum weld force)+C·(first maximum weld force)+D·(second maximum weld force). Thus, in this case, the DoE may be used to determine the parameters A, B, C, and D. Blocks 404 to 418 of the process 400 involve generating an initial weld information algorithm (e.g., a weld strength prediction algorithm). Blocks 420 to 436 involve validating the initial algorithm.

At block 404, the weld parameters to be used are selected. For example, as mentioned above, these parameters may include a minimum weld force, a first maximum weld force, and a second maximum weld force. As another example, these parameters may also include one or more of a weld current, a start force, or a stop force.

At block 406, N samples are welded. N may be any number sufficient for obtaining an algorithm with desired estimation accuracy. In some cases, a larger N may provide a more accurate algorithm. In some implementations, N is at least 30.

At block 408, the N samples are tested. For example, each sample may be subjected to a tensile shear test, a bond shear test, a peel shear test, or some other type of weld strength test.

Based on the testing of block 408, the actual weld strength value for each weld is determined at block 410. For example, a weld strength A may be measured for the first weld, a weld strength B may be measured for the second weld, and so on.

At block 412, force signals are acquired for each of the welds of block 406. As discussed herein, the force signals may include, for each weld, a minimum weld force, a first maximum weld force, and a second maximum weld force in some examples.

At optional block 414, optional signals may be acquired for each of the welds of block 406. As discussed herein, the optional signals may include, for each weld, a weld current, a start force, or a stop force in some examples.

At block 416, a single order linear regression is conducted based on the force signals from block 412, the weld strength values from block 410, and the optional information 414 if applicable. The single order linear regression creates a weld information algorithm (e.g., a weld strength prediction algorithm) at block 418. Predictive analytics may be used in place of the single order regression (e.g., if the predictive analytics produce less prediction error when compared with the single order linear regression).

At block 420, a new set of M samples are welded.

At block 422, the new set of M samples are tested. For example, each sample may be subjected to a tensile shear test, a bond shear test, a peel shear test, or some other type of weld strength test.

Based on the testing of block 422, the actual weld strength value for each of the new welds is determined at block 424. For example, a weld strength C may be measured for the first new weld, a weld strength D may be measured for the second new weld, and so on.

At block 426, force signals are acquired for each of the new welds of block 420. As discussed herein, the force signals may include, for each new weld, a minimum weld force, a first maximum weld force, and a second maximum weld force in some examples.

At optional block 428, optional signals may be acquired for each of the new welds of block 420. As discussed herein, the optional signals may include, for each new weld, a weld current, a start force, or a stop force in some examples.

At block 430, the weld information algorithm created at block 418 is applied to the force signals of block 426 (and the optional signals of block 428 if applicable). This results in an indication of the quality (e.g., the strength) of each of the new welds of block 420.

At block 432, this indication is compared to the actual weld strength values generated at block 424. For example, a determination may be made as to whether the total error range between the actual weld strength values (from block 424) and the predicted values (from block 430) is less than or equal to a threshold.

If the total error range is less than or equal to the threshold, the algorithm is accepted for production at block 434. Otherwise, the algorithm is rejected at block 436.

Figure 5:
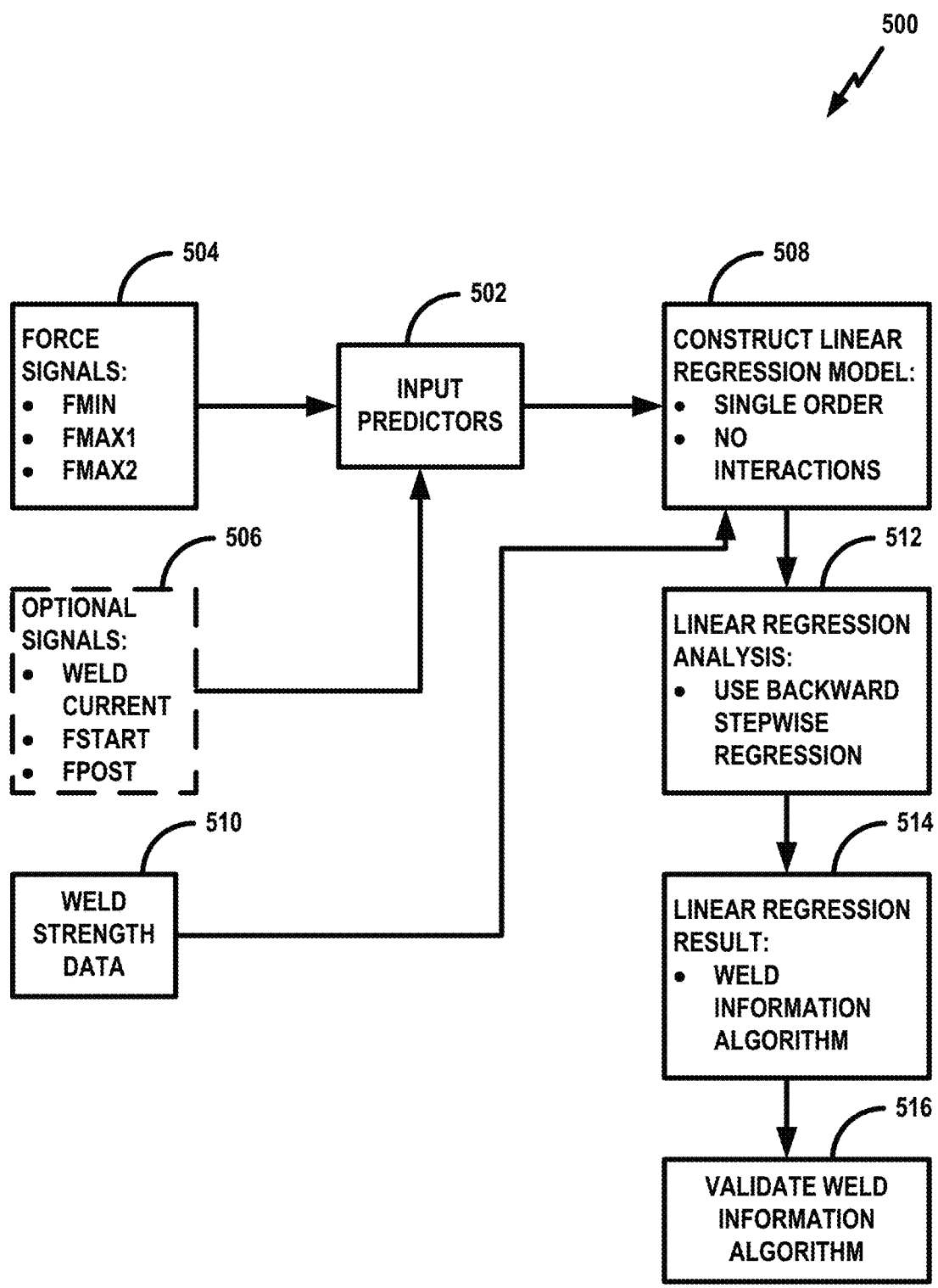
FIG. 5 is a flowchart of an example of a linear regression process for a weld information algorithm according to one or more aspects of the disclosure.

FIG. 5 illustrates an example of a linear regression process 500 for generating a weld information algorithm. The process 500 may take place, for example, in a welding system (e.g., a resistance welding system). Of course, in various aspects within the scope of the disclosure, the process 500 may be implemented using any suitable apparatus capable of supporting welding-related (e.g., resistance welding-related) operations. For example, one or more of the operations of the process 500 may be performed by programming executed by a computer or a processor.

At block 502, a set of input predictors for the linear regression is obtained. These input predictors may include the force signals 504 discussed herein (e.g., at block 412 of FIG. 4). These input predictors may also include the optional signals 506 discussed herein (e.g., at block 414 of FIG. 4).

At block 508, a linear regression model is constructed based on the input predictors and weld strength data 510 (e.g., from block 410 of FIG. 4). For example, the input predictors may be entered into input factor columns of a DoE matrix and the weld quality data may entered into output response columns of the DoE matrix.

In some implementations, the linear regression model may be of single order. In some implementations, the adjusted R-squared values produced by the regression analysis may be ignored. In some implementations, the linear regression model may have no interactions between variables. In some implementations, the regression model may be replaced by a predictive analytics model.

In practice, second order and third order input factor interactions may produce a DoE model that fits the N-welds sample data very closely, but actually decreases the accuracy for predicting the weld quality (e.g., tensile shear, tensile peel, etc.) of new welds used to validate the prediction formula. Thus, higher order models may provide a less accurate estimate of weld quality.

At block 512, a linear regression analysis (e.g., a backward stepwise regression) is performed based on the linear regression model of block 508. This results in the linear regression result of block 514 (e.g., parameters for the weld information algorithm).

At block 516, the weld information algorithm is validated (e.g., as described in FIG. 4).

A specific weld quality estimation example follows. It should be appreciated that other parameters and other parameter values may be used in other examples.

The example uses the following welding parameters and associated values: SQZ period=150 milliseconds (ms), UP period=10 ms, WELD period=15 ms, DOWN period=0 ms, and HOLD period=150 ms. The current is held constant at 2.60 kAmps (peak). The static weld force is 25 pounds (lbs).

A single order historical DoE containing 30-rows is constructed. Each DoE row represents a single weld. The DoE input factors are: Fstart, Fmax1, Fmin, Fmax2, Fpost, and peak weld current (Ipk). The DoE output factor is: tensile-shear (peak value).

Thirty welds are made and the dynamic weld force data is collected for each input factor. This data is entered into the appropriate input factor columns in the DoE matrix. Tensile-shear tests are conducted on each weld and the tensile shear data is entered in the appropriate output response column in the DoE Matrix. For purposes of illustration, the first five welds in the DoE Matrix are shown in Table-1 below.

TABLE 1

| | Input Factors | | | | | | Output |
|---|---|---|---|---|---|---|---|
| Run | Weld Current Peak (KA) | Start Force (lbs) | Min Force (lbs) | Max-1 Force (lbs) | Max-2 Force (lbs) | Post Weld Force (lbs) | Response Actual Tensile (N) |
| 1 | 2.70 | 24.269 | 23.750 | 24.779 | 25.916 | 25.339 | 216 |
| 2 | 2.71 | 24.941 | 23.093 | 24.983 | 26.038 | 25.366 | 223 |
| 3 | 2.71 | 24.798 | 23.905 | 24.969 | 26.045 | 25.270 | 222 |
| 4 | 2.69 | 25.007 | 24.038 | 25.273 | 26.137 | 25.390 | 224 |
| 5 | 2.71 | 25.298 | 23.250 | 24.741 | 26.115 | 25.298 | 232 |

A single order regression run on the 30 welds may produce the following prediction formula: Predicted Tensile=314.84−(4.057×Fmin)−(7.473×Fmax1)+(7.466×Fmax2).

To validate the prediction formula, additional welds are made and the actual tensile-shear data for the additional welds is compared against the predicted data for the additional welds. If the error range between the actual and predicted values is low (e.g., less than or equal to a threshold amount), then the tensile-shear testing of new or future welds may be avoided. For a resistance welding process, an error range of less than 15% may provide a useful non-destructive production weld quality metric.

Continuing with the above example, an additional 70 welds are made with the same welding parameters used to create the prediction formula. Tensile-shear or peel-shear tests are conducted on all 70 welded samples and the peak values are recorded.

The maximum and minimum actual tensile-shear values and corresponding predicted tensile shear values are then obtained, and the worst case tensile-shear range error percentage is calculated for all 70-welds using the formulas of Equation 1:

Range$_{max}$=(Tensile$_{actual\ max}$−Tensile$_{pred\ max}$)/Tensile$_{actual\ max}$ Range$_{min}$=(Tensile$_{actual\ min}$−Tensile$_{pred\ min}$)/Tensile$_{actual\ min}$ Total Range=Range$_{max}$−Range$_{min}$ Table 2 below lists a worst case error range summary from the calculations of Equation 1. In this example, the total range is very similar in magnitude to ±3 standard deviations where all error values fall within 99.7% of the area under a normal distribution curve.

|  | Actual Predicted Tensile (N) | % Tensile (N) | Difference |
|---|---|---|---|
| Max | 237.0 | 227.3 | 4.08% |
| Min | 209.0 | 227.6 | −8.90% |
| Total Range |  |  | 12.98% |

Table 2

Thus, the teachings herein for estimating a welded sample's weld quality using non-destructive dynamic weld force and weld current measurements may provide a very good prediction accuracy (e.g., 87% in the above example).

In some implementations, techniques other than a linear regression analysis may be used to generate a weld information algorithm or another mechanism for estimating weld quality. For example, techniques such as a fuzzy logic network, a neural network, or predictive analytics may be used to determine the quality of a weld based on the inputs discussed herein.

Figure 6:
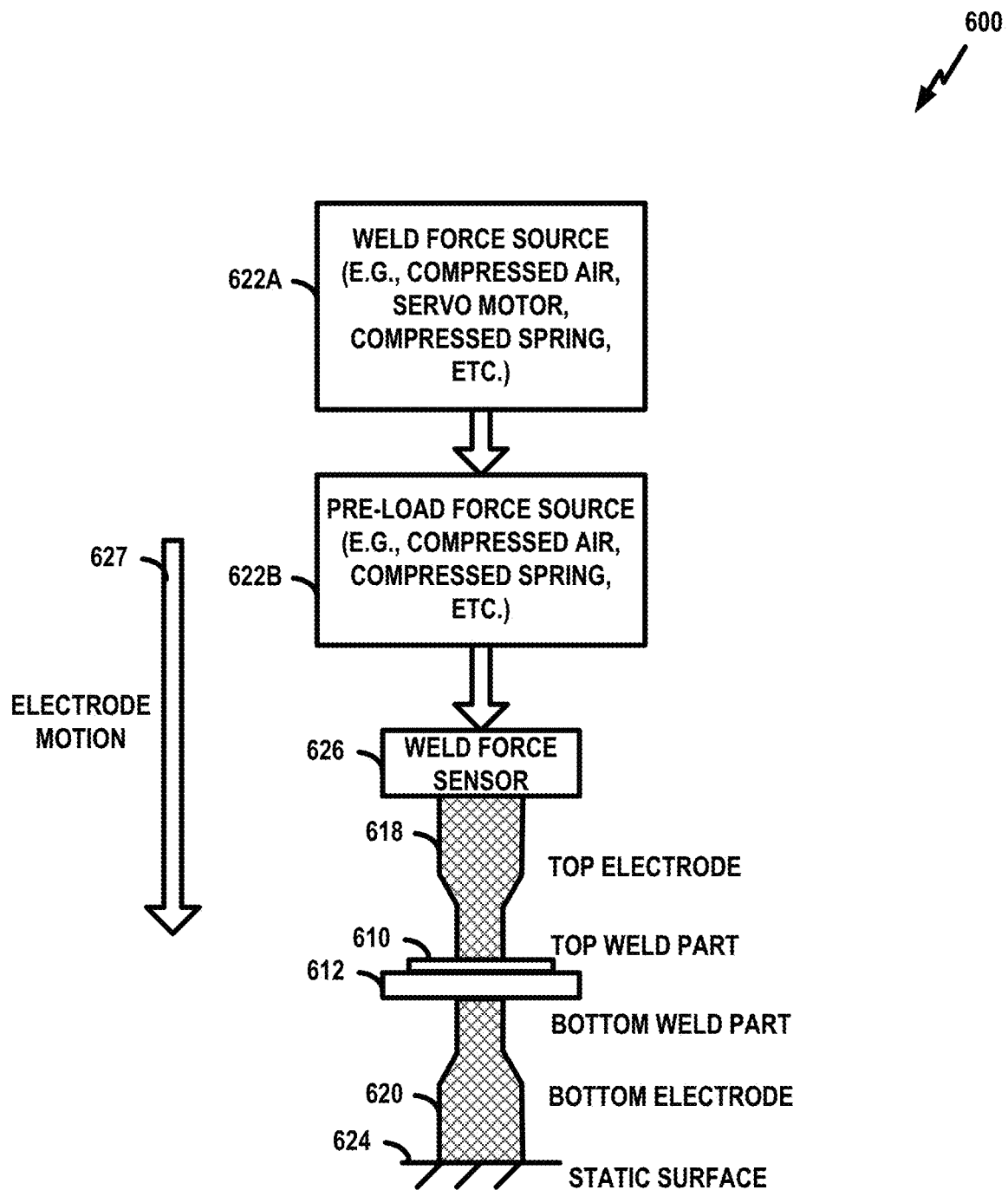
FIG. 6 is a conceptual diagram of an example of forces in a welding system according to one or more aspects of the disclosure.
Figure 7:
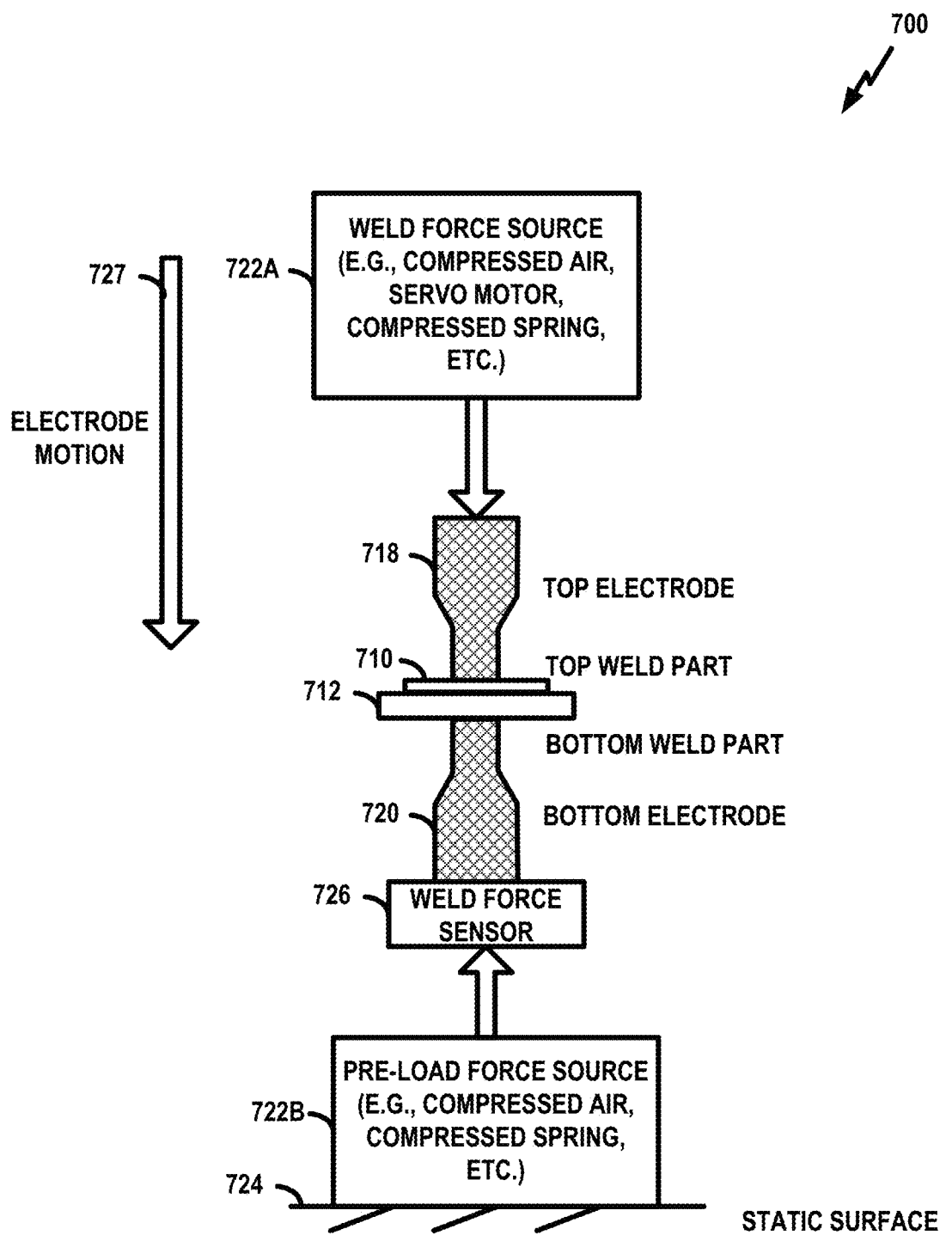
FIG. 7 is a conceptual diagram of another example of forces in a welding system according to one or more aspects of the disclosure.
Figure 8:
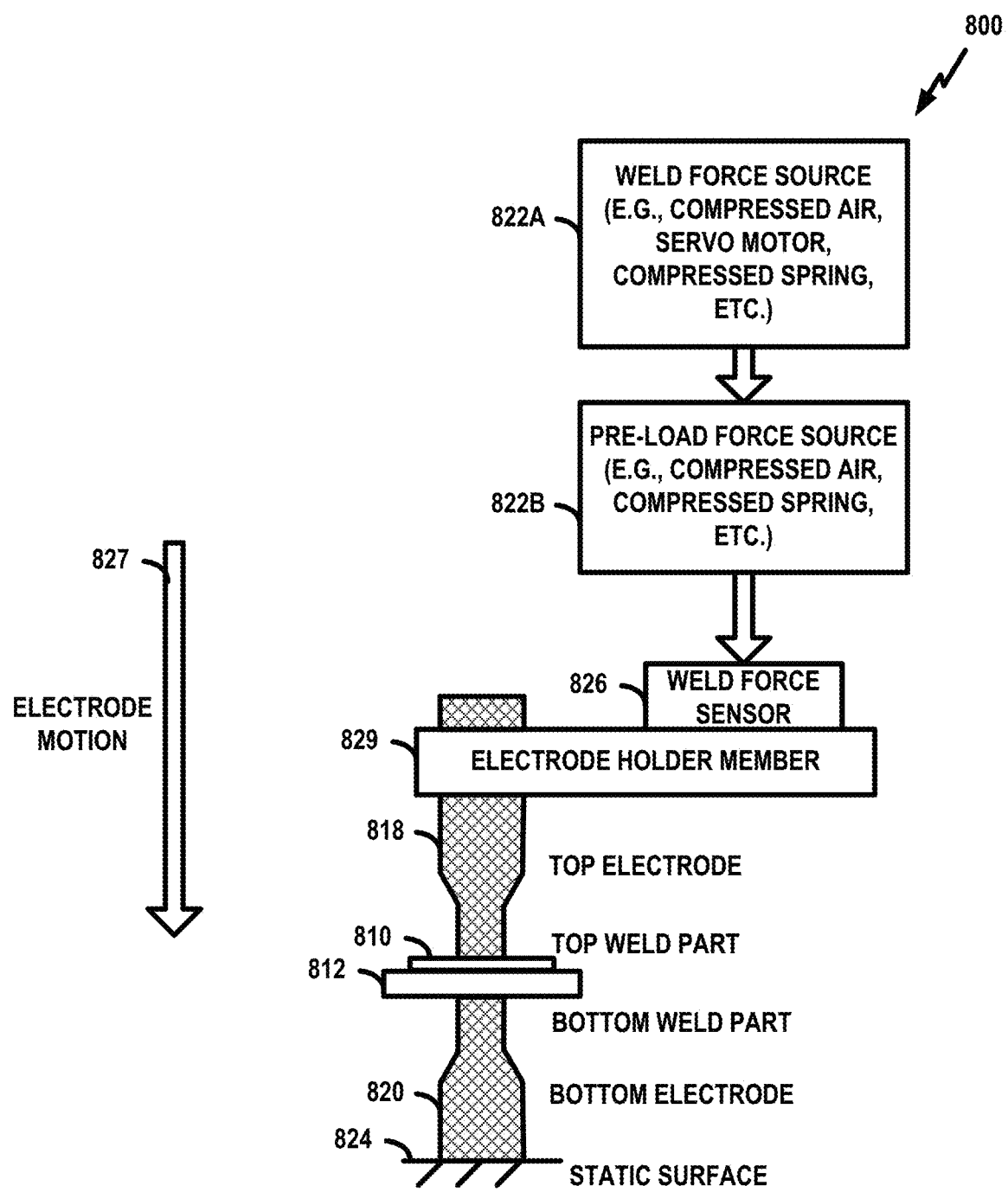
FIG. 8 is a conceptual diagram of another example of forces in a welding system according to one or more aspects of the disclosure.

FIGS. 6, 7, and 8 illustrate examples of weld force sensors that measure force in-line with at least one weld electrode. Here, the weld force sensors are positioned in-line or substantially in-line with at least one weld electrode. For example, a weld force sensor may be positioned directly in-line with an electrode as in FIGS. 6 and 7 or positioned offset from a weld electrode as in FIG. 8, yet still measure force as it is applied in-line with the electrode. In contrast with welding systems that place a weld force sensor at or near the weld force source, placing the weld force sensor in-line may provide better force measurements. For example, a direct in-line measurement may provide a higher dynamic weld force signal-to-noise ratio.

FIG. 6 illustrates a welding system 600 with a first example placement of a weld force sensor at a location that is in-line with at least one weld electrode. Similar to FIG. 2, in FIG. 6, a top weld part 610 is being welded to a bottom weld part 612 using a top electrode 618 and a bottom electrode 620 (e.g., that is removably fixed to a static surface 624 by a coupling mechanism, not shown).

A weld force source 622A is mechanically coupled to the top electrode 618 via a weld force sensor 626 (and, optionally, a pre-load force source 622B). The weld force sensor 626 is positioned above the top electrode 618 (e.g., using a releasable coupling mechanism that allows the weld force sensor 626 and/or the top electrode 618 to be replaced). A pre-load force from the pre-load force source 622B may be applied to the weld force sensor 626 as discussed above. To facilitate placement of the weld force sensor 626 at this location, the weld force sensor 626 may be electrically insulated from the weld current that passes through the top electrode 618.

During the welding operation, force from the weld force source 622A is applied to the top electrode 618. This force causes the top electrode 618 to move 627 toward the bottom electrode 620 thereby squeezing the top weld part 610 and the bottom weld part 612 together.

In this example, the weld force sensor 626 is positioned in-line with the force applied to the top electrode 618 (e.g., as opposed to being indirectly coupled to the welding system to measure applied force). Thus, the weld force sensor 626 may obtain better force measurements (e.g., as compared to a welding system where the weld force sensor is not in-line with the applied force at an electrode). A welding system where a machine (e.g., a lever, a pivot, etc.) is used to indirectly couple a force from a weld force source to an electrode may be an example of a weld force sensor not being in-line with the applied force at the electrode. For example, in this case, a weld force sensor located on the weld force source side of the machine would not be in-line with the applied force at the electrode.

FIG. 7 illustrates a welding system 700 with a second example placement of a weld force sensor at a location that is in-line with at least one weld electrode. Similar to FIG. 6, in FIG. 7, a top weld part 710 is being welded to a bottom weld part 712 using a top electrode 718 and a bottom electrode 720.

A weld force source 722A is mechanically coupled to the top electrode 718 (e.g., by a releasable coupling mechanism that allows the top electrode 718 to be replaced). A weld force sensor 726 is positioned below the bottom electrode 720 (e.g. using a releasable coupling mechanism that allows the weld force sensor 726 and/or the bottom electrode 720 to be replaced). A pre-load force from a pre-load force source 722B (e.g., that is removably fixed to a static surface 724 by a coupling mechanism, not shown) may be applied to the weld force sensor 726 as discussed above. To facilitate placement of the weld force sensor 726 at this location, the weld force sensor 726 may be electrically insulated from the weld current that passes through the bottom electrode 720.

During the welding operation, force from the weld force source 722A is applied to the top electrode 718. This force causes the top electrode 718 to move 727 toward the bottom electrode 720 thereby squeezing the top weld part 710 and the bottom weld part 712 together.

In this example, the weld force sensor 726 is positioned in-line with the force applied to the bottom electrode 720. Thus, the weld force sensor 726 may obtain better force measurements (e.g., as compared to a welding system where the weld force sensor is not in-line with the applied force at an electrode).

FIG. 8 illustrates a welding system 800 with a third example placement of a weld force sensor at a location that measures force in-line with at least one weld electrode. In this case, while the weld force sensor is offset from the at least one weld electrode, the weld force sensor still measures force applied to the at least one weld electrode in-line with (e.g., substantially in-line with) the application of force from a force source to the at least one weld electrode. In the example of FIG. 8, the force signal integrity might be of lower quality than the force signal integrity of the examples of FIGS. 6 and 7 (e.g., due to possible deflection of an electrode holder member), but may still be substantially better than a welding system where a weld force sensor is placed on the weld force source side of a mechanical linkage (e.g., a machine) between the weld force source and the at least one electrode. Similar to FIG. 6, in FIG. 8, a top weld part 810 is being welded to a bottom weld part 812 using a top electrode 818 and a bottom electrode 820 (e.g., that is removably fixed to a static surface 824 by a coupling mechanism, not shown).

A weld force source 822A is mechanically coupled to an electrode holder member 829 via a weld force sensor 826 (and, optionally, a pre-load force source 822B). The electrode holder member 829 is mechanically coupled the top electrode 818 (e.g. using a releasable coupling mechanism that allows the top electrode 818 to be replaced). The weld force sensor 826 is positioned above the electrode holder member 829 (e.g. using a releasable coupling mechanism that allows the weld force sensor 826 to be replaced). A pre-load force from the pre-load force source 822B may be applied to the weld force sensor 826 as discussed herein. To facilitate placement of the weld force sensor 826 at this location, the weld force sensor 826 may be electrically insulated from the weld current that passes through the top electrode 818.

During the welding operation, downward force from the weld force source 822A is applied, via the electrode holder member 829 in a downward direction to the top electrode 818. This force causes the top electrode 818 to move 827 toward the bottom electrode 820 thereby squeezing the top weld part 810 and the bottom weld part 812 together.

In this example, the weld force sensor 826 measures the in-line force applied to the top electrode 818. For example, the weld force sensor 826 is directly between the weld force source 822A and the top electrode 818, without an intervening machine (e.g., a lever, a gear, etc.). Thus, the weld force sensor 826 may obtain better force measurements (e.g., as compared to a welding system where the weld force sensor is not in-line with the applied force at an electrode).

Figure 9:
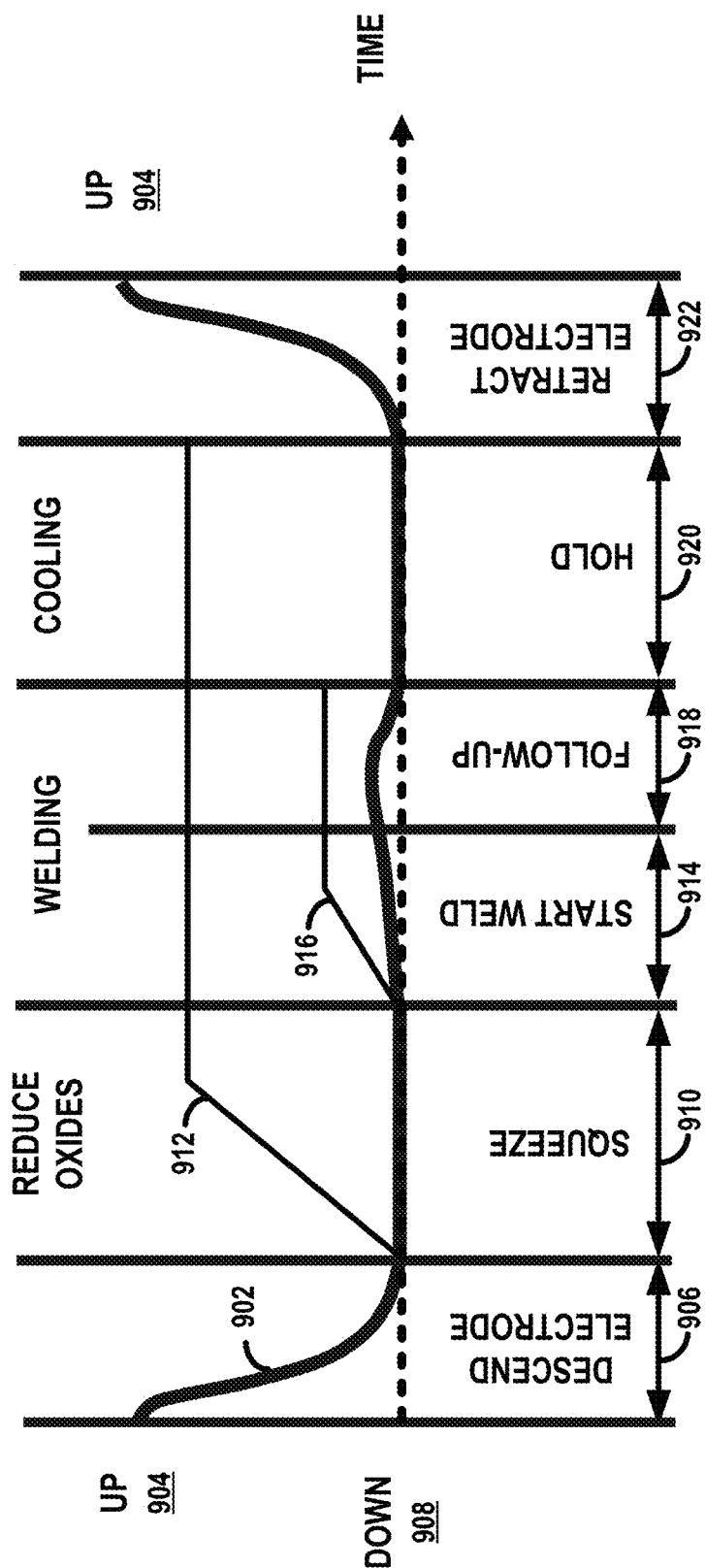
FIG. 9 is a conceptual diagram of the position of a weld head during a welding process according to one or more aspects of the disclosure.

FIG. 9 illustrates an example of weld head action in a welding system. Here, a curve 902 represents changes in position of a top electrode during a welding operation. Initially, the top electrode s in an UP position 904 (the terms UP and DOWN as used herein are relative, and could be replaced with other indicia of position in other examples). In the example of FIG. 9, the curve 902 is associated with six time periods.

During a first period 906, the electrode held by the weld head descends toward the part to be welded until the electrode reaches a DOWN position 908 (e.g., the time at which an electrode first makes contact with the part). The duration of the first period 906 may be based on, for example, the distance between the UP position 904 and the DOWN position 908 and the velocity at which the weld head moves. For some applications, the first period 906 may be on the order of 50 to 150 milliseconds. The first period 906 may correspond to the first period 304 of FIG. 3.

A second period 910 represents a squeeze (SQZ) period where further pressure is applied to the part by the electrode (e.g., to reduce oxides in the weld). The second period 910 may correspond to the SQZ period 310 of FIG. 3. A waveform 912 represents an example of force generated by the weld head. In some implementations, the weld head may include a force sensor that measures the amount of force generated by the weld head. For some applications, the maximum applied force may be on the order of 20-25 pounds (pounds-force).

A third period 914 represents a weld start period. As indicated by a waveform 916, the weld current may be ramped up during this period. The waveform 916 may correspond to the waveform 326 of FIG. 3. A fourth period 918 represents a weld follow-up period. The third period 914 and the fourth period 918 may correspond to the weld period 312 of FIG. 3. The duration of these periods may depend on how long it takes to achieve the desired weld. These periods may also be referred to as a heating period during which melting of the part may occur. As a result of the part melting, the weld head may experience temporary push-back from the weld, as indicated by the upward movement of the electrode shown during the third period 914 and the fourth period 918.

A fifth period 920 represents a hold period. The fifth period 920 may correspond to the hold period 314 of FIG. 3. These periods may be referred to as a cooling period during which the weld cools.

During a sixth period 922, the electrode held by the weld head is moved away from the welded part until the weld head reaches the UP position 904. The sixth period 922 may correspond to the third period 308 of FIG. 3.

Figure 10:
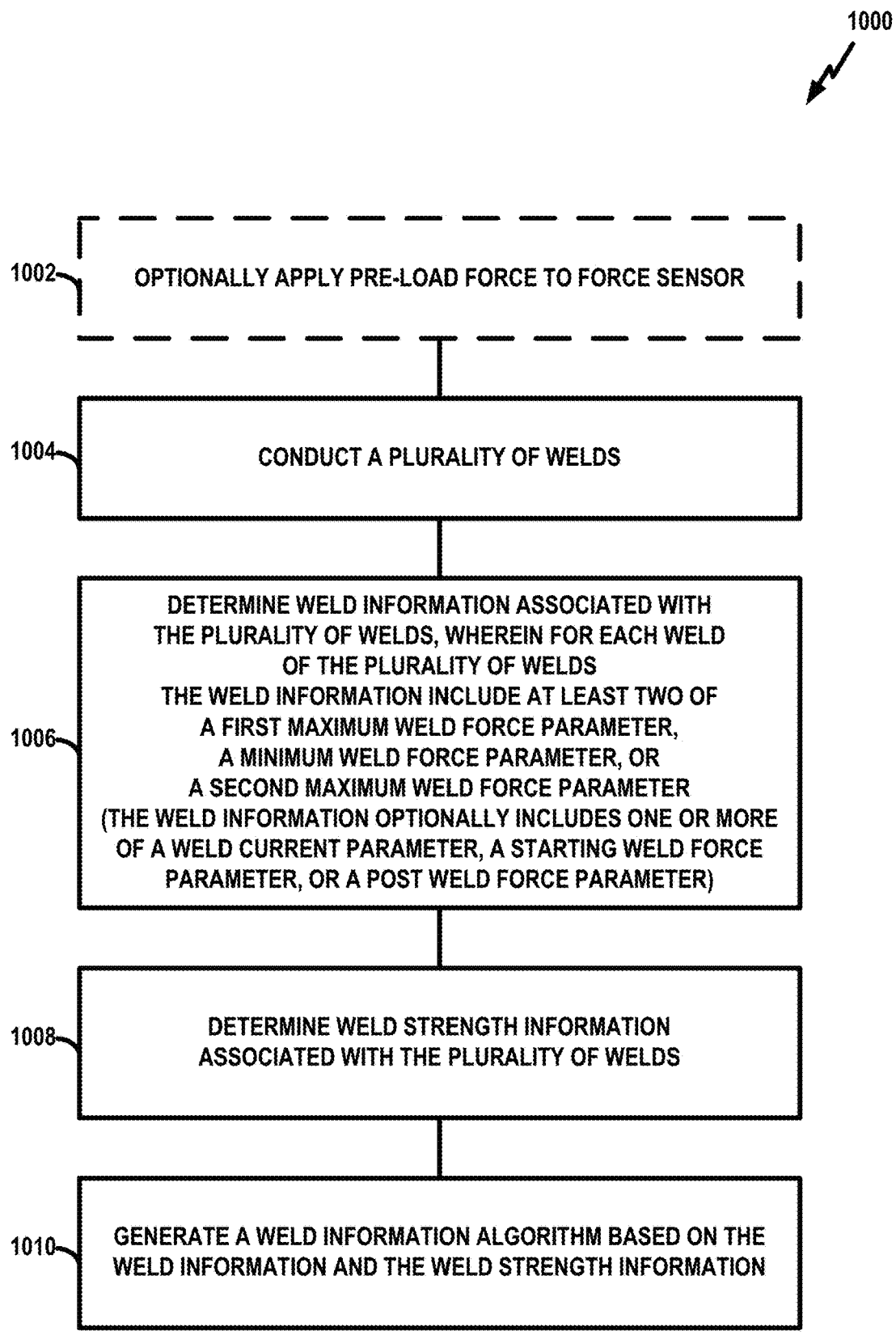
FIG. 10 is a flowchart of an example of a process for generating a weld information algorithm according to one or more aspects of the disclosure.

FIG. 10 illustrates an example of a process 1000 for generating a weld information algorithm (e.g., a weld quality estimation algorithm). The process 1000 may take place, for example, in a welding system (e.g., a resistance welding system). Of course, in various aspects within the scope of the disclosure, the process 1000 may be implemented using any suitable apparatus capable of supporting welding-related (e.g., resistance welding-related) operations. For example, one or more of the operations of the process 1000 may be performed by programming executed by a computer or a processor.

At optional block 1002, a welding system (e.g., a force source of the welding system) may apply a pre-load force to a force sensor.

At block 1004, the welding system conducts a plurality of welds. For example, the welding system may make a first weld, a second weld, a third weld, and so on.

At block 1006, the welding system (e.g., a processor associated with the welding system) determines (e.g., measures) weld information associated with each of the plurality of welds. In some implementations, determining the weld information may include a processor associated with the welding system calculating weld information values based on received signals. In some implementations, determining the weld information may include measuring weld signals (e.g., using one or more sensors associated with the welding system). In some examples, for each weld of the plurality of welds the weld information may include at least two of a first maximum weld force parameter, a minimum weld force parameter, or a second maximum weld force parameter.

For example, during a first weld a first set of weld information including a first maximum weld force parameter, a minimum weld force parameter, and a second maximum weld force parameter may be determined. Then, during a second weld a second set of weld information including a first maximum weld force parameter, a minimum weld force parameter, and a second maximum weld force parameter may be determined, and so on.

As another example, during a first weld a first set of weld information including a first maximum weld force parameter and a minimum weld force parameter may be determined. Then, during a second weld a second set of weld information including a first maximum weld force parameter and a minimum weld force parameter may be determined, and so on.

As yet another example, during a first weld a first set of weld information including a first maximum weld force parameter and a second maximum weld force parameter may be determined. Then, during a second weld a second set of weld information including a first maximum weld force parameter and a second maximum weld force parameter may be determined, and so on.

As still another example, during a first weld a first set of weld information including a minimum weld force parameter and a second maximum weld force parameter may be determined. Then, during a second weld a second set of weld information including a minimum weld force parameter and a second maximum weld force parameter may be determined, and so on.

The weld information may optionally include one or more of a weld current, a starting weld force parameter, or a post weld force parameter. For example, for each weld of the plurality of welds the weld information may further include a weld current. As another example, for each weld of the plurality of welds the weld information may further include a starting weld force parameter and a post weld force parameter.

In some examples, determining the weld information may include for each weld of the plurality of welds: applying a weld current during a weld period; acquiring (e.g., measuring and/or calculating) the first maximum weld force parameter during the weld period; acquiring (e.g., measuring and/or calculating) the minimum weld force parameter after acquiring the first maximum weld force parameter during the weld period; and acquiring (e.g., measuring and/or calculating) the second maximum weld force parameter during a hold period that follows the weld period, wherein the weld current is not applied during the hold period.

In some examples, determining the weld information may include for each weld of the plurality of welds: acquiring (e.g., measuring and/or calculating) a starting weld force parameter at a start of a weld squeeze period that precedes the weld period, wherein the weld current is not applied during the weld squeeze period; acquiring (e.g., measuring and/or calculating) a weld current parameter commencing an end of the weld squeeze period and terminating at an end of the weld period; and acquiring (e.g., measuring and/or calculating) a post weld force parameter at an end of the weld hold period.

In some examples, determining the weld information may include receiving weld force signals from a force sensor. In some examples, the force sensor may be located in-line with at least one electrode used for the plurality of welds. In some examples, the force sensor may be located between a first electrode of the at least one electrode and an attachment mechanism for the first electrode. In some examples, the force sensor may be located between a first electrode of the at least one electrode and a force generator that is configured to apply a force to the first electrode. In some examples, the force sensor may include a load cell. In some examples, the process 1000 may further include applying a pre-load force to the force sensor prior to application of welding pressure to the at least one electrode.

At block 1008, the welding system (e.g., a processor associated with the welding system) determines (e.g., measures) weld strength information associated with the plurality of welds. For example, each of the welds may be tested to determine the weld strength of each weld. Examples of this testing may include, without limitation, a tensile shear test, a bond shear test, or a peel shear test. In some implementations, determining the weld strength information may include a processor associated with the welding system calculating weld strength information values based on received signals. In some implementations, determining the weld strength information may include measuring weld strength (e.g., using one or more sensors associated with the welding system).

In some examples, determining the weld strength information may include testing each weld of the plurality of welds. In some examples, the testing may include at least one of: a tensile shear test, a bond shear test, or a peel shear test.

At block 1010, the welding system (e.g., a processor associated with the welding system) generates a weld information algorithm based on the weld information and the weld strength information. For example, a processor may generate weld information algorithm parameters from the weld information and the weld strength information. In some implementations, the welding system may perform a first order linear regression on the weld information and the weld strength information to generate a weld information algorithm of the form: A+B·(minimum weld force)+C·(first maximum weld force)+D·(second maximum weld force), where A, B, C, and D are obtained from the first order linear regression. Other formulas could be used in other examples. In some examples, an adjusted $R^2$ error of the first order linear regression may be less than 0.5. As discussed herein, the weld information algorithm may be a first order algorithm in some examples.

In some examples, the weld information algorithm may provide an indication of weld quality. In some examples, generating the weld information algorithm may include performing a first order linear regression on the weld information and the weld strength information.

Figure 11:
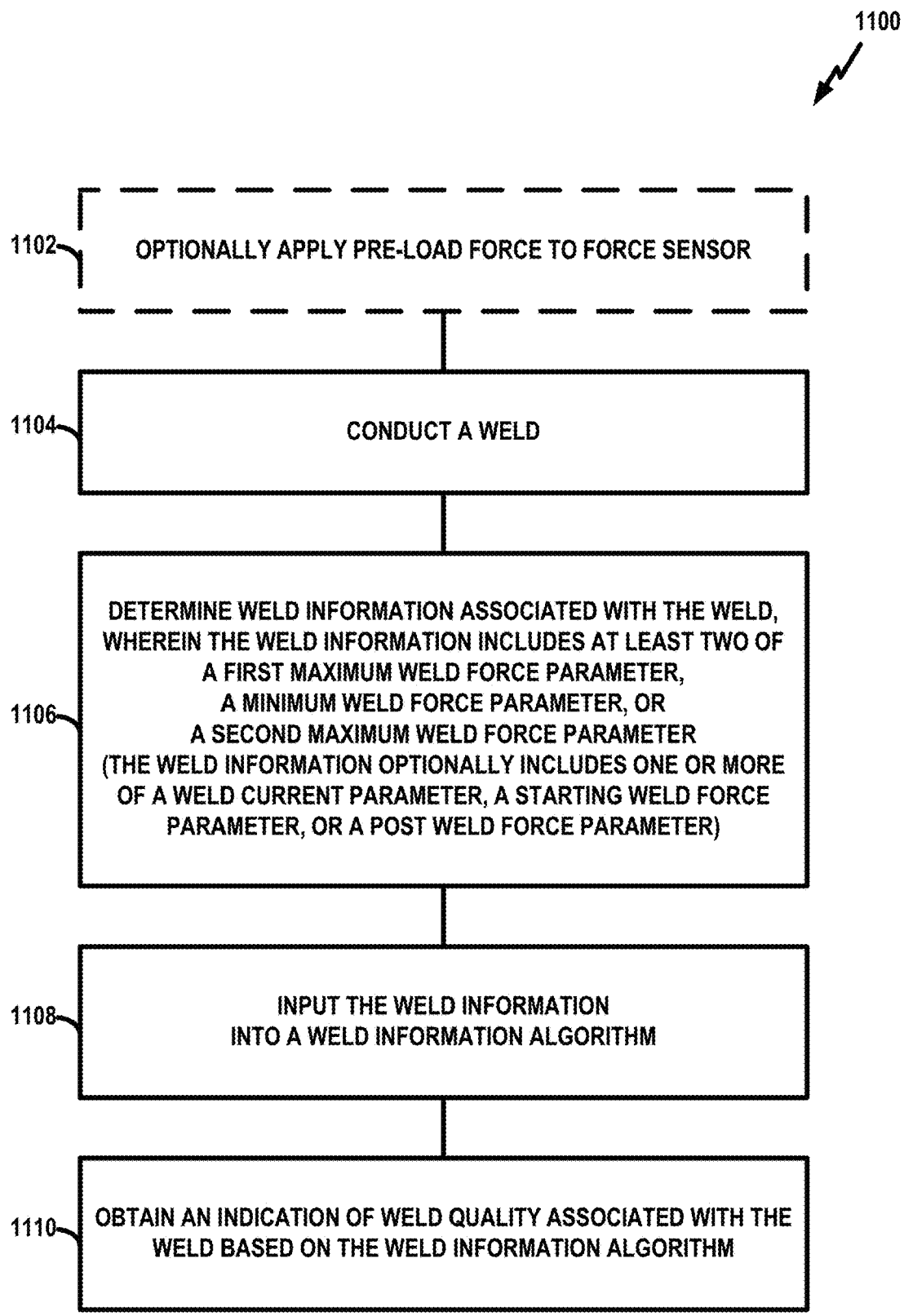
FIG. 11 is a flowchart of an example of a process for estimating weld quality according to one or more aspects of the disclosure.

FIG. 11 illustrates an example of a process for estimating a quality of a weld (e.g., based on the weld information algorithm generated by the process 1000 of FIG. 10). The process 1100 may take place, for example, in a welding system (e.g., a resistance welding system). Of course, in various aspects within the scope of the disclosure, the process 1100 may be implemented using any suitable apparatus capable of supporting welding-related operations (e.g., resistance welding-related). For example, one or more of the operations of the process 1100 may be performed by programming executed by a computer or a processor.

At optional block 1102, a welding system (e.g., a force source of the welding system) may apply a pre-load force to a force sensor.

At block 1104, the welding system conducts a weld. For example, the welding system may weld a first part to a second part.

At block 1106, the welding system (e.g., a processor associated with the welding system) determines (e.g., measures) weld information associated with the weld. In some implementations, determining the weld information may include a processor associated with the welding system calculating weld information values based on received signals. In some implementations, determining the weld information may include measuring weld signals (e.g., using one or more sensors associated with the welding system). In some examples, the weld information may include at least two of a first maximum weld force parameter, a minimum weld force parameter, or a second maximum weld force parameter.

The weld information may optionally include one or more of a weld current, a starting weld force parameter, or a post weld force parameter. For example, the weld information may further include a weld current. As another example, the weld information may further include a starting weld force parameter and a post weld force parameter.

In some examples, determining the weld information may include: applying (e.g., measuring and/or calculating) a weld current during a weld period; acquiring (e.g., measuring and/or calculating) the first maximum weld force parameter during the weld period; acquiring (e.g., measuring and/or calculating) the minimum weld force parameter after acquiring the first maximum weld force parameter during the weld period; and acquiring (e.g., measuring and/or calculating) the second maximum weld force parameter during a hold period that follows the weld period, wherein the weld current is not applied during the hold period.

In some examples, determining the weld information may include: acquiring (e.g., measuring and/or calculating) a starting weld force parameter at a start of a weld squeeze period that precedes the weld period, wherein the weld current is not applied during the weld squeeze period; acquiring (e.g., measuring and/or calculating) a weld current parameter commencing an end of the weld squeeze period and terminating at an end of the weld period; and acquiring (e.g., measuring and/or calculating) a post weld force parameter at an end of the weld hold period.

In some examples, determining the weld information may include receiving weld force signals from a force sensor. In some examples, the force sensor may be located in-line with at least one electrode used for the weld. In some examples, the force sensor may be located between a first electrode of the at least one electrode and an attachment mechanism for the first electrode. In some examples, the force sensor may be located between a first electrode of the at least one electrode and a force generator that is configured to apply a force to the first electrode. In some examples, the force sensor may include a load cell. In some examples, the process 1100 may further include applying a pre-load force to the force sensor prior to application of welding pressure to the at least one electrode.

At block 1108, the welding system (e.g., a processor associated with the welding system) inputs the weld information into a weld information algorithm (e.g., a weld quality estimation algorithm). In some examples, the weld information algorithm may include a first order algorithm. In some examples, the weld information algorithm may be of the form: A+B·(minimum weld force)+C·(first maximum weld force)+D·(second maximum weld force).

At block 1110, the welding system (e.g., a processor associated with the welding system) obtains (e.g., calculates) an indication of weld quality associated with the weld based on the weld information algorithm. In some examples, the indication of weld quality may include an estimate of at least one of: weld tensile strength, bond shear strength, or weld peel strength.

The teachings herein may be implemented in a variety of ways. For example, the structure and functionality taught herein may be incorporated into various types of imaging systems (e.g., of various configurations) and into other types of apparatuses. As another example, an apparatus as taught herein may be constructed using a variety of components and materials.

The subject matter described herein may be implemented in hardware, software, firmware, other forms of programming, or any combination thereof. As such, the terms "function," and the like as used herein may refer to hardware, which may also include software and/or firmware components, for implementing the feature being described. Different embodiments of an apparatus (e.g., device) as taught herein may include a variety of hardware and software processing components. In some embodiments, hardware components such as processors, controllers, state machines, logic, or some combination of these components, may be used to implement one or more of the described components, circuits, or functions. In some implementations, such a hardware component comprises a processing system such as, for example, a processor device, a controller, an application specific integrated circuit (ASIC), or a system on a chip (SoC).

In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Some aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Moreover, any reference to elements herein using a designation such as "first," "second," and so forth does not generally limit the quantity or order of those elements. Rather, these designations may be used herein as a convenient method of distinguishing between two or more different elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Also, terminology of the form "at least two of A, B, or C" means "A and B" or "A and C" or "B and C" or "A and B and C."

While certain embodiments have been described above in detail and shown in the accompanying drawings, it is to be understood that such embodiments are merely illustrative of and not restrictive of the teachings herein. In particular, it should be recognized that the teachings herein apply to a wide variety of apparatuses and methods. It will thus be recognized that various modifications may be made to the illustrated embodiments or other embodiments, without departing from the broad scope thereof. In view of the above, it will be understood that the teachings herein are intended to cover any changes, adaptations or modifications which are within the scope of the disclosure.

What is claimed is:

1. A method comprising:
   conducting a plurality of welds;
   determining weld information associated with the plurality of welds, wherein for each weld of the plurality of welds the weld information comprises at least two of a first maximum weld force parameter, a minimum weld force parameter, or a second maximum weld force parameter;
   determining weld strength information associated with the plurality of welds; and
   generating a weld information algorithm based on the weld information and the weld strength information, wherein generating the weld information algorithm comprises performing a first order linear regression on the weld information and the weld strength information, wherein the weld information algorithm is of the form: A+B·(minimum weld force)+C·(first maximum weld force)+D·(second maximum weld force), where A, B, C, and D are obtained from the first order linear regression.

2. The method of claim 1, wherein for each weld of the plurality of welds the weld information further comprises a weld current.

3. The method of claim 1, wherein for each weld of the plurality of welds the weld information further comprises a starting weld force parameter and a post weld force parameter.

4. The method of claim 1, wherein the weld information algorithm provides an indication of weld quality.

5. The method of claim 1, wherein the weld information algorithm comprises a first order algorithm.

6. The method of claim 1, wherein an adjusted $R^2$ error of the first order linear regression is less than 0.5.

7. A method comprising:
   conducting a plurality of welds;
   determining weld information associated with the plurality of welds, wherein for each weld of the plurality of welds the weld information comprises at least two of a first maximum weld force parameter, a minimum weld force parameter, or a second maximum weld force parameter;
   determining weld strength information associated with the plurality of welds; and
   generating a weld information algorithm based on the weld information and the weld strength information,
   wherein determining the weld information comprises for each weld of the plurality of welds:
      applying a weld current during a weld period;
      acquiring the first maximum weld force parameter during the weld period;
      acquiring the minimum weld force parameter after acquiring the first maximum weld force parameter during the weld period; and
      acquiring the second maximum weld force parameter during a hold period that follows the weld period, wherein the weld current is not applied during the hold period.

8. The method of claim 7, wherein determining the weld information comprises for each weld of the plurality of welds:
   acquiring a starting weld force parameter at a start of a weld squeeze period that precedes the weld period, wherein the weld current is not applied during the weld squeeze period;
   acquiring a weld current parameter commencing an end of the weld squeeze period and terminating at an end of the weld period; and
   acquiring a post weld force parameter at an end of the weld hold period.

9. The method of claim 1, wherein determining the weld information comprises receiving weld force signals from a force sensor.

10. The method of claim 9, wherein the force sensor is located in-line with at least one electrode used for the plurality of welds.

11. The method of claim 9, wherein the force sensor is located between an electrode holder member for the first electrode and a force generator that is configured to apply a force to the first electrode.

12. The method of claim 9, wherein the force sensor is located between a first electrode of the at least one electrode and a force generator that is configured to apply a force to the first electrode.

13. The method of claim 9, wherein the force sensor comprises a load cell.

14. The method of claim 9, further comprising:
   applying a pre-load force to the force sensor prior to application of welding pressure to the at least one electrode.

15. The method of claim 1, wherein determining the weld strength information comprises testing each weld of the plurality of welds.

16. The method of claim 15, wherein the testing comprises at least one of: a tensile shear test, a bond shear test, or a peel shear test.

17. A method comprising:
   conducting a weld;
   determining weld information associated with the weld, wherein the weld information comprises at least two of a first maximum weld force parameter, a minimum weld force parameter, or a second maximum weld force parameter, wherein the weld information algorithm is of the form: A+B·(minimum weld force)+C·(first maximum weld force)+D·(second maximum weld force);

inputting the weld information into a weld information algorithm; and obtaining an indication of weld quality associated with the weld based on the weld information algorithm.

18. The method of claim 17, wherein the weld information further comprises a weld current.

19. The method of claim 17, wherein the weld information further comprises a starting weld force parameter and a post weld force parameter.

20. The method of claim 17, wherein the indication of weld quality comprises an estimate of at least one of: weld tensile strength, bond shear strength, or weld peel strength.

21. The method of claim 17, wherein the weld information algorithm comprises a first order algorithm.

22. A method comprising:
   conducting a weld;
   determining weld information associated with the weld, wherein the weld information comprises at least two of a first maximum weld force parameter, a minimum weld force parameter, or a second maximum weld force parameter;
   inputting the weld information into a weld information algorithm; and
   obtaining an indication of weld quality associated with the weld based on the weld information algorithm,
   wherein determining the weld information comprises:
      applying a weld current during a weld period;
      acquiring the first maximum weld force parameter during the weld period;
      acquiring the minimum weld force parameter after acquiring the first maximum weld force parameter during the weld period; and
      acquiring the second maximum weld force parameter during a hold period that follows the weld period, wherein the weld current is not applied during the hold period.

23. The method of claim 22, wherein determining the weld information comprises:
   acquiring a starting weld force parameter at a start of a weld squeeze period that precedes the weld period, wherein the weld current is not applied during the weld squeeze period;
   acquiring a weld current parameter commencing an end of the weld squeeze period and terminating at an end of the weld period; and
   acquiring a post weld force parameter at an end of the weld hold period.

24. The method of claim 17, wherein determining the weld information comprises receiving weld force signals from a force sensor.

25. The method of claim 24, wherein the force sensor is located in-line with at least one electrode used for the weld.

26. The method of claim 24, wherein the force sensor is located between an electrode holder member for the first electrode and a force generator that is configured to apply a force to the first electrode.

27. The method of claim 24, wherein the force sensor is located between a first electrode of the at least one electrode and a force generator that is configured to apply a force to the first electrode.

28. The method of claim 7, wherein the weld information algorithm provides an indication of weld quality.

29. The method of claim 7, wherein:
   determining the weld information comprises receiving weld force signals from a force sensor; and
   the force sensor is located in-line with at least one electrode used for the plurality of welds.

30. The method of claim 22, wherein:
   determining the weld information comprises receiving weld force signals from a force sensor; and
   the force sensor is located in-line with at least one electrode used for the plurality of welds.

* * * * *